United States Patent
Bluhme

(10) Patent No.: US 10,427,271 B2
(45) Date of Patent: Oct. 1, 2019

(54) GRINDING ARM FOR GRINDING OF WORKPIECES WITH AN INNER PROFILE WITH A GRINDING WHEEL

(71) Applicants: KAPP Werkzeugmaschinen GmbH, Coburg (DE); NILES Werkzeugmaschinen GmbH, Berlin (DE)

(72) Inventor: Ronald Bluhme, Berlin (AT)

(73) Assignees: KAPP WERKZEUGMASCHINEN GMBH, Coburg (DE); NILES WERKZEUGMASCHINEN GMBH, Berlin (DE)

( * ) Notice: Subject to any disclaimer, the term of this patent is extended or adjusted under 35 U.S.C. 154(b) by 148 days.

(21) Appl. No.: 15/788,071

(22) Filed: Oct. 19, 2017

(65) Prior Publication Data

US 2018/0111250 A1 Apr. 26, 2018

(30) Foreign Application Priority Data

Oct. 21, 2016 (DE) .................. 10 2016 012 915

(51) Int. Cl.
*B24B 47/12* (2006.01)
*B24B 5/06* (2006.01)
(Continued)

(52) U.S. Cl.
CPC .......... *B24B 47/12* (2013.01); *B23F 23/1262* (2013.01); *B24B 5/01* (2013.01);
(Continued)

(58) Field of Classification Search
CPC ......... B23F 23/1262; B24B 5/06; B24B 5/10; B24B 5/40; B24B 5/423; B24B 27/0084;
(Continued)

(56) References Cited

U.S. PATENT DOCUMENTS 3,667,165 A * 6/1972 McDowell .............. B24B 7/075
451/11
3,883,323 A * 5/1975 Cooley ................... E01B 31/17
451/347
(Continued)

FOREIGN PATENT DOCUMENTS

DE 3539409 A1 6/1986
DE 4416059 A1 11/1995
(Continued)

OTHER PUBLICATIONS

Die Profilschleifmaschinen LFG 800-1250 from Liebherr, pp. 1-4.

*Primary Examiner* — Timothy V Eley
(74) *Attorney, Agent, or Firm* — Lucas & Mercanti, LLP

(57) ABSTRACT

A grinding arm for grinding workpieces with an inner profile with a grinding wheel. The grinding arm has a tube-shaped base body with a longitudinal axis, in which the grinding wheel is supported at one axial end region. A first drive for the grinding wheel is arranged in its other axial end region. A first transmission system transmits the rotation from the first drive to the grinding wheel. In order to adjust arbitrary angles of inclination of the grinding wheel in the grinding arm, the grinding wheel is arranged on a grinding spindle driven by the first transmission system and rotating around an axis of rotation. The grinding spindle is supported in a carrier body arranged in the base body rotatable around an axis perpendicular to the longitudinal axis as well as perpendicular to the axis of rotation, wherein the axis of rotation and the axis intersect.

11 Claims, 3 Drawing Sheets

(51) Int. Cl.
*B24B 5/01* (2006.01)
*B24B 41/02* (2006.01)
*B24B 41/04* (2006.01)
*B23F 23/12* (2006.01)
*B24B 27/00* (2006.01)

(52) U.S. Cl.
CPC ............ *B24B 5/06* (2013.01); *B24B 27/0084* (2013.01); *B24B 41/02* (2013.01); *B24B 41/04* (2013.01)

(58) Field of Classification Search
CPC ....... B24B 41/02; B24B 41/04; B24B 41/047; B24B 41/12
See application file for complete search history.

(56) References Cited

U.S. PATENT DOCUMENTS

| | | | | |
|---|---|---|---|---|
| 4,229,977 | A * | 10/1980 | Newton | B24B 49/16 73/487 |
| 4,244,416 | A * | 1/1981 | Newton | B29D 30/0633 157/13 |
| 4,826,369 | A * | 5/1989 | Bennett | B23F 1/02 408/79 |
| 4,934,106 | A * | 6/1990 | Setzer | B24B 5/01 451/249 |
| 4,954,028 | A * | 9/1990 | Seroo | B23F 5/02 409/26 |
| 4,989,378 | A * | 2/1991 | Junker | B24B 5/06 451/221 |
| 5,065,546 | A | 11/1991 | Lorenz | |
| 8,341,844 | B2 * | 1/2013 | Tsukamoto | B24B 5/06 29/898.066 |
| 9,102,031 | B2 * | 8/2015 | Page | B24B 27/0015 |
| 9,108,258 | B2 * | 8/2015 | Stadtfeld | B23F 15/06 |
| 9,266,179 | B2 | 2/2016 | Geiser | |
| 2008/0176493 | A1 * | 7/2008 | Chao | B24B 23/02 451/294 |
| 2013/0072096 | A1 * | 3/2013 | Hoerner | B23F 23/1218 451/259 |
| 2013/0121779 | A1 | 5/2013 | Geiser | |
| 2018/0318981 | A1 * | 11/2018 | Armborst | B24B 47/12 |

FOREIGN PATENT DOCUMENTS

| | | |
|---|---|---|
| DE | 10329724 A1 | 1/2005 |
| DE | 102011103216 A1 | 12/2012 |
| DE | 102011118312 A1 | 5/2013 |
| DE | 202016004284 U1 | 9/2016 |
| EP | 0416151 B1 | 3/1991 |
| JP | S5558919 A | 5/1980 |

* cited by examiner

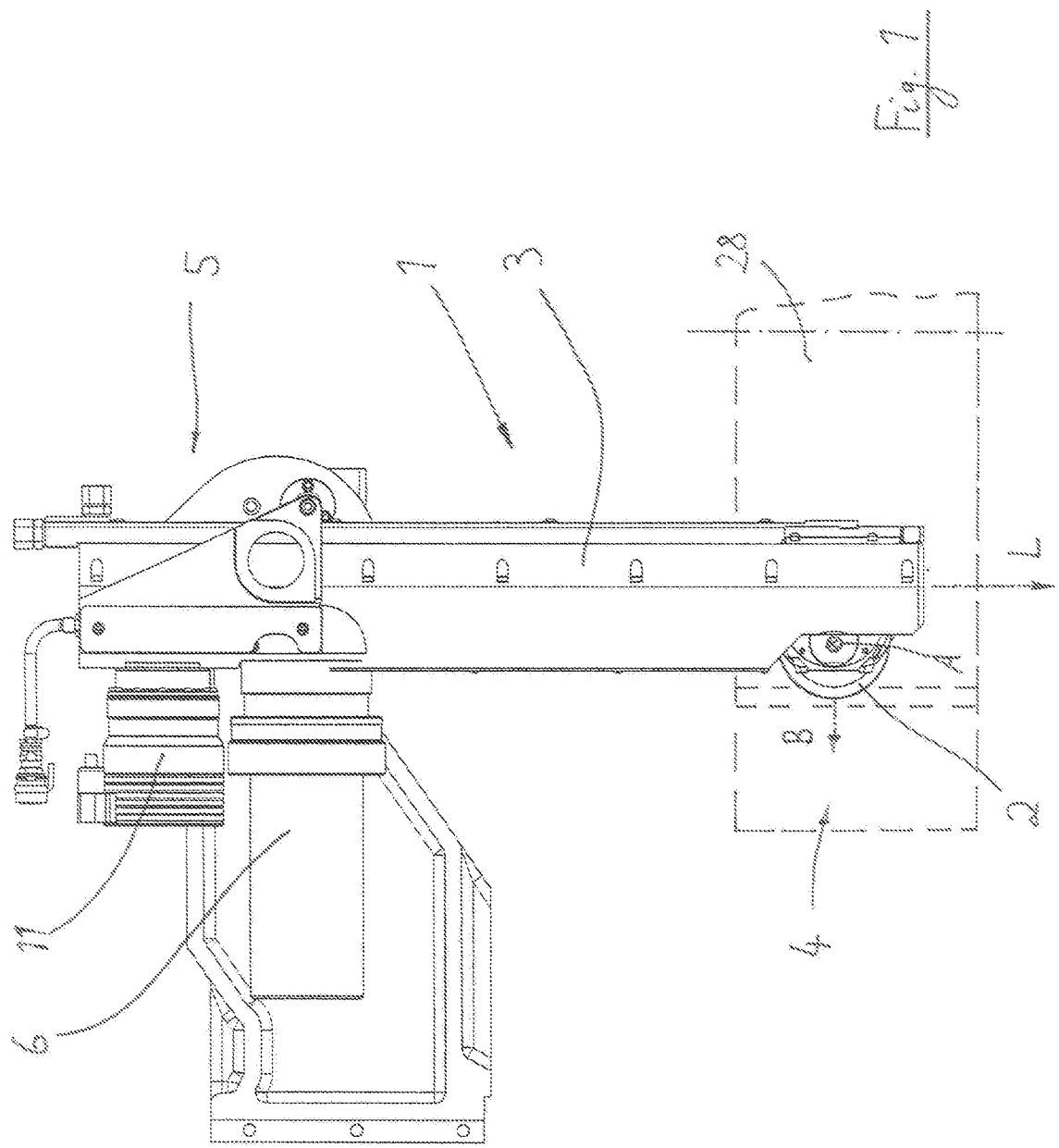

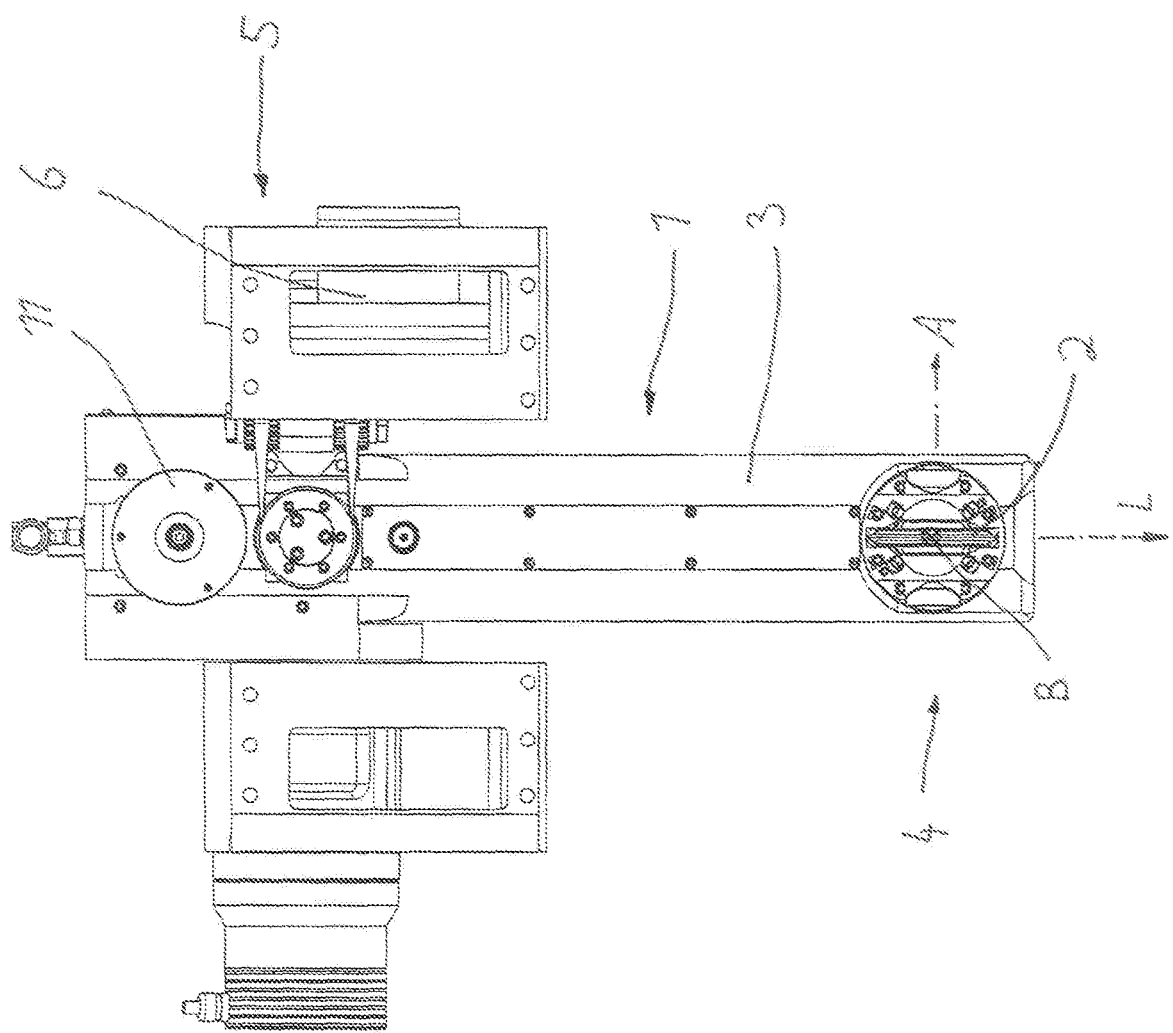

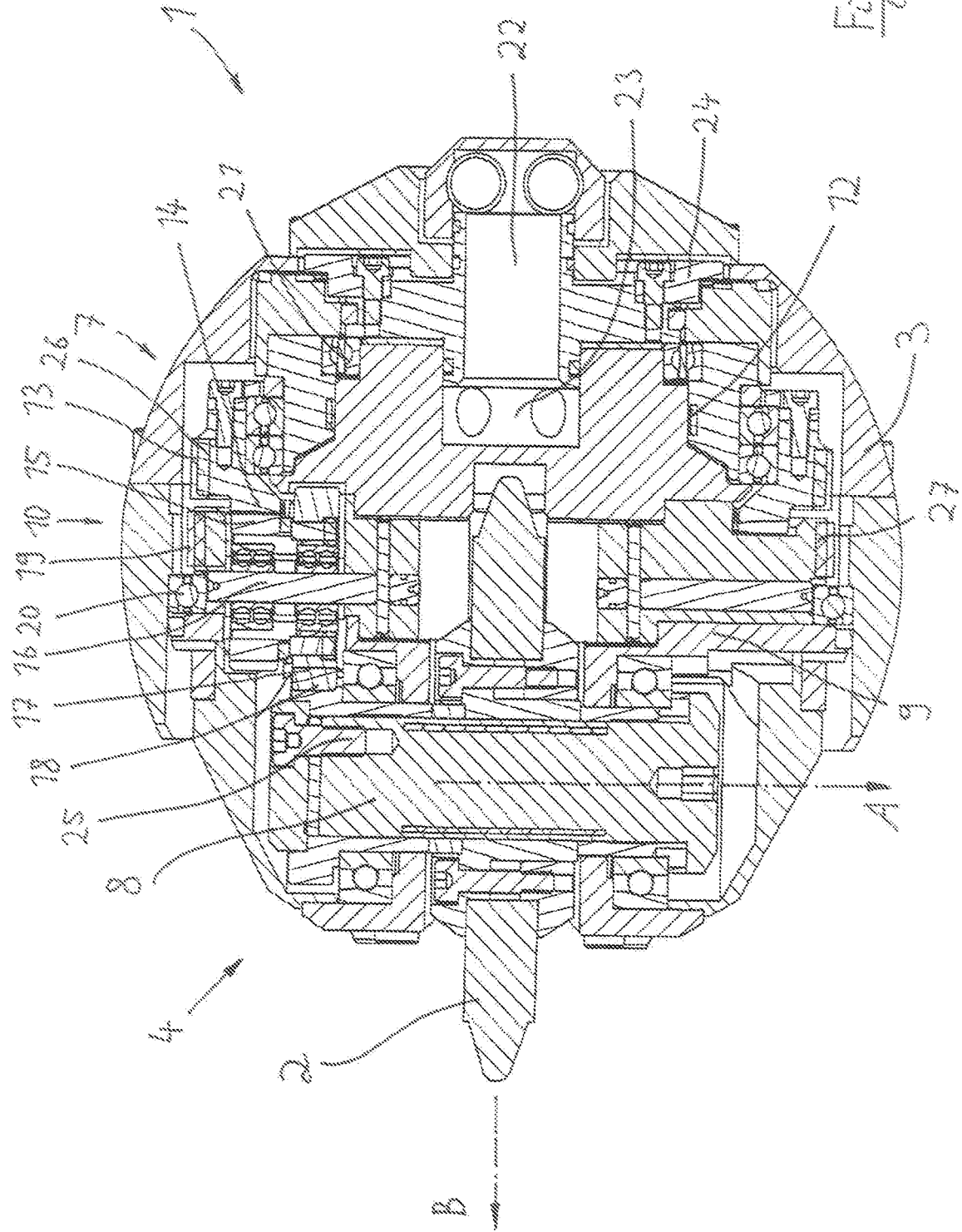

GRINDING ARM FOR GRINDING OF WORKPIECES WITH AN INNER PROFILE WITH A GRINDING WHEEL

CROSS-REFERENCE TO RELATED APPLICATIONS

The present application claims priority of DE 10 2016 012 915.8, filed Oct. 21, 2016, the priority of this application is hereby claimed and this application is incorporated herein by reference.

BACKGROUND OF THE INVENTION

The invention relates to a grinding arm for grinding of workpieces with an inner profile with a grinding wheel, wherein the grinding arm comprises a tube-shaped base body with a longitudinal axis, in which the grinding wheel is supported at one of the axial end regions and a first drive for the grinding wheel is arranged in its other axial end region, wherein the transmission of the rotation from the first drive to the grinding wheel takes place by means of a first transmission system.

A grinding arm of the generic kind is known from EP 0 416 151 B1. The tube-shaped arm is here driven at one of its axial ends via a driving shaft, wherein a pinion is driven which drives a toothed belt. At the other axial end of the arm a further shaft is arranged which also bears a pinion which is driven by the toothed belt. The grinding spindle is then driven via this shaft. Thereby arrangements are made so that the grinding wheel can be adjusted to a desired helix angle which is necessary in the case of grinding of a helical gear.

Other solutions are disclosed in DE 20 2016 004 284 U1, in DE 10 2011 103 216 A1 and in DE 10 2011 118 312 A1.

It is detrimental that the adjustment onto said helix angle is relatively laborious and especially limited to a certain angle range.

SUMMARY OF THE INVENTION

It is the object of the invention to propose a generic grinding arm by which in the helix angle for grinding of helical gears or similar profiles can be adjusted in an especially easy manner. Furthermore, it is a special aspect of the invention that no limitation of the helix angle should be given, i. e. it should be possible that arbitrary angles can be adjusted.

The solution of this object by the invention is characterized in that the grinding wheel is arranged on a grinding spindle which is driven by the first transmission system and is rotating around an axis of rotation, wherein the grinding spindle is supported in a carrier body which is arranged in the base body rotatable around an axis which axis is perpendicular to the longitudinal axis as well as perpendicular to the axis of rotation, wherein the axis of rotation and the axis intersect.

Advantageously, a rotation of the grinding wheel including the carrier body around the axis by 360° is possible.

Preferably it is provided that the carrier body can be rotated in the base body via a second transmission system by a second drive.

According to a further embodiment clamping means can be arranged by which the carrier body can be clamped in the base body in a relative position. As a preferred design of the clamping means a hydraulic expanding mandrel can be provided.

The first transmission system comprises preferably a first belt, especially a first toothed belt, or a first chain which runs (via respective pulleys and pinions respectively) between the two axial end regions of the base body. Thereby, the first belt or the first chain preferably drives a first gear element, especially a crown wheel, a bevel wheel or a friction wheel, which is rotatably supported in one axial end region of the base body, wherein the first gear element drives a second gear element, especially a pinion, which is connected directly or indirectly with the grinding spindle. The second gear element is according to a further embodiment arranged on an intermediate shaft which drives the grinding spindle via a further pair of gearing.

Also the second transmission system comprises preferably a second belt, especially a second toothed belt, or a second chain which runs (via respective pulleys and pinions respectively) between the two axial end regions of the base body. Thereby it is preferably provided that the second belt or the second chain is connected with the carrier body and can rotate the same around the axis, wherein the grinding spindle is supported in the carrier body. The bearing of the carrier body occurs preferably by means of two roller bearings in one axial end region of the base body.

As mentioned as first gear element preferably a crown wheel and a bevel wheel with a conical toothing respectively is employed by which the second gear element is driven which is a pinion. However, it is also possible here the use of a set of friction wheels for the transmission of the movement of rotation of the driven pulley (directly or indirectly) to the grinding spindle.

The size of the different components and especially of the grinding wheel is chosen in such a manner that the gearing which has to be ground can be ground without difficulty. If a small diameter of the grinding wheel is chosen it is possible, if applicable, to grind also internal toothing with a small pitch circle diameter. So, the grinding of small tip circle diameters of an internal toothing is possible.

Beneficially, it is possible with the proposed grinding arm to keep the grinding wheel endless pivotable, i. e. namely to swivel around the whole angle range (360°) so that with respect to the helix angle arbitrary teething and similar profiles can be ground.

So, depths of immersion up to 350 mm can be realized at arbitrary helix angles without difficulty.

The length of the grinding arm (e. g. 350 mm) can of course be adapted to the situation.

For a stiff design a short arm is normally preferred, the arm can also be designed longer for other workpieces, wherein in each case the proper grinding technology is applied.

The bigger the cross section of the arm is the longer also a flexural resistant stiff arm design can be. The cross section of the grinding arm influences the bending stiffness and can be positively influenced at extreme length and cross section ratios by an adapted technology.

The carried grinding oil supply is also endless pivotable (i. e. around 360°) so that the supply with lubricant is possible in an optimal manner.

Beneficially, also a measuring system can be integrated into the grinding arm which is also carried around the whole circumference (360°).

Dressable grinding wheels as well as such with steel base body, which is coated with abrasive material, can be used. For a precise clamping of the grinding wheel on the grinding spindle preferably a hydraulic expanding mandrel is used. A quick and safe change of the grinding wheel can take place by a change of the front plate or by a quick disassembly and assembly of the expanding mandrel.

High workpieces can be ground in one clamping without difficulty. Also, the grinding of a cluster clamping is possible.

The proposed concept can also be designed in a modular manner by using interchangeable holding plates (front plates) to realized variable sections of the size of the grinding wheel.

So, internal and external teething with arbitrary helix angles can be ground by the proposed grinding arm. Also (internal and external) grooves and threads can be ground, also (internal and external arranged) bearing seats with shoulders, plane surfaces and with special profiles also free-form surfaces.

Beneficially, the restriction of the pivoting angle of the grinding wheel which was given up to now is not any longer existent. It is possible without problems to hold and to place respectively the grinding wheel precisely on the swivel axis, i. e. the centre of the grinding wheel is exactly on the swivel axis.

Also, a direct measurement of the grinding result can take place. The 360° angle measurement system is located directly on the swivel axis.

The supply of the grinding oil can be designed in an optimal manner to support the grinding process. This is done by the concentric feed of the grinding oil which allows an effective supply with grinding oil around 360°.

When the grinding wheel is adjusted at a desired helix angle a clamping of the grinding spindle at the angle can occur so that a precise grinding can take place. Preferably thereby a hydraulic expanding mandrel (hydraulic expanding ring) is employed.

Thus, with the proposed grinding arm an expansion of functions at high flexibility with regards to the grinding of teething and other profiles in a grinding machine can occur.

The transmission of the driving power for the grinding wheel occurs via the first and second gear element (especially via the set of crown wheels or the set of bevel wheels) which allows a respective high transmission of power.

For the transmission of the driving power of the grinding wheel as well as the transmission of the rotational movement for pivoting of the grinding wheel and grinding spindle respectively onto the desired helix angle especially separate single toothed belts are used (and similar elements respectively).

Beneficially, the proposed grinding arm can be easily adjusted and adapted respectively to different kinds of grinding machines.

Advantageous is a high stiffness of the design in all load directions, furthermore a good damping property.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 1 shows in the side view a first embodiment of the grinding arm according to the invention with a workpiece which has to be ground, FIG. 2 shows in the front view a second embodiment of the grinding arm and FIG. 3 shows a sectional view through the grinding arm according to FIG. 1 and FIG. 2 respectively in a height of the lower axial and of the grinding arm.

DETAILED DESCRIPTION OF THE INVENTION

In FIG. 1 a grinding arm 1 is shown by which a workpiece 28 is ground, namely an internal helical gearing of the same, which is arranged at the inner circumference of the hollow cylindrical designs workpiece 28. The grinding arm 1 has a base body 3 which is designed substantially tube-shaped. In one of its (lower) axial end regions 4 a grinding wheel 2 is arranged in the base body 3, in the other (upper) axial end region 5 of the base body 3 a first drive 6 for driving of the grinding wheel 2 is arranged. It cannot be seen in FIG. 1 that for driving of the grinding wheel 2 a toothed belt is running in the inner of the base body 3 which transmits the driving power from the first drive 6 to the grinding wheel 2.

The grinding wheel 2 must be adjusted to a helix angle which is necessary to grind the helical gearing of the workpiece 28. The pivoting of the grinding wheel 2 takes place around and axis B which is perpendicular to the longitudinal axis L of the base body 3 as well as to the axis of rotation A of the grinding wheel 2 (in FIG. 1 the axis of rotation A is perpendicular to the plane of projection).

For the adjustment of the grinding wheel 2 to the desired or required pivoting angle a second drive 11 is provided which is also arranged in an (upper) axial end region 5 of the base body 3.

When comparing FIGS. 1 and 2 (in FIG. 2 the grinding arm 1 is shown rotated by 90° around the longitudinal axis L) it can be seen that the drive of the grinding wheel 2 by the first drive 6 can occur in a different manner with respect to the construction in the (upper) end region 5 of the base body 3. As shown in FIG. 1 a direct arrangement of the drive 6 at the grinding arm 1 can be provided or also, as shown in FIG. 2, an indirect arrangement can be provided at which the driving power is transmitted via driving means (toothed belts, intermediate shafts) which are displaced to the outer side. Which solution is chosen depends on the situation at the grinding machine in which the grinding arm 1 is employed.

The concrete specific design of the grinding arm 1 becomes apparent from the cross sectional view according to FIG. 3, wherein here a section perpendicular to the longitudinal axis L is shown, namely in the height of the grinding wheel 2, wherein the same is here adjusted to a pivoting angle of 0° for sake of clarity.

In the (upper) axial end region 5 of the grinding arm 1, as already mentioned, two (not depicted) pulleys are supported which are driven by the drives 6 and 11. A first toothed belt 13 runs downwards in the inner of the grinding arm 1 to the region of the axial end region 4 of the base body 3. In FIG. 3 the first toothed belt 13 is denoted which runs around a first belt pulley 26 which is connected torque proof with a first gear element 14 in the form of a bevel wheel (the belt pulley 26 and the gear element 14 can be designed as a one-piece). The bevel wheel 14 is supported rotatable in the lower axial end region 4 of the base body 3 and meshes with the bevel gearing with a second gear element 15 in the form of a pinion. The pinion 15 is supported on an intermediate shaft 16 which is arranged rotatable in a carrier body 9 (the intermediate shaft 16 is presently designed as pin and bolt respectively on which roller bearings are arranged by which it is supported). The carrier body 9 is rotatable supported around the axis B in the lower axial end region 4 of the base body 3. Two roller bearings 20 and 21 serve for this purpose.

It is essential that the axis of rotation A and the axis B intersect. Thereby beneficially a rotation of the grinding wheel 2 including the carrier body 9 around the axis B by 360° is possible.

On the intermediate shaft 16 a second pair of gearing 17 and 18 is arranged (spur-gear), wherein the gearing 18 is connected torque proof with the grinding spindle 8 which bears the grinding wheel 2.

If accordingly the first toothed belt 13 is driven by the first drive 6 the same rotates the bevel wheel 14 and thus via the pinion 15 the intermediate shaft 16. The intermediate shaft 16 drives in turn via the pair of gearing 17 and 18 the grinding spindle 8 and accordingly the grinding wheel 2.

The first toothed belt 13, the bevel wheel 14, the pinion 15, the intermediate shaft 16 and the pair of gearing 17, 18 thus form a first transmission system 7 by which the driving power of the first drive 6 is transferred to the grinding spindle 8 and thus to the grinding wheel 2.

Beside this a second transmission system 10 exists by which a rotational movement can be transferred from the second drive 11 onto the carrier body 9 in such a manner that the grinding wheel 2 is adjusted around the axis B to the desired helix angle.

The second transmission system 10 comprises a second toothed belt 19 which runs around a second belt pulley 17 which in turn runs around the carrier body 9. If accordingly the second drive 11 is activated the second belt pulley 27 is rotated via the second toothed belt 19 and thus the carrier body 9 around the axis B. For doing so no stop exists so that the full circumference (360°) is covered, i. e. the grinding wheel 2 can be rotated completely around the axis B.

If a desired helix angle is adjusted clamping means 12 in the form of hydraulic clamping means can be actuated to clamp the carrier body 9 relatively to the bottom region of the grinding arm 1.

For the clamping of the grinding wheel 2 on the grinding spindle 8 a hydraulic expanding mandrel 25 is provided.

In order to supply the grinding wheel 2 at all adjusted helix angles always sufficiently with grinding oil a grinding oil supply 22 is provided which guides to a grinding oil distribution 23; from here the grinding wheel 2 is supplied with grinding oil.

A measurement system 24 should still be mentioned which serves for measuring the ground toothing and ground profile respectively.

In the above description the grinding tool was addressed as being a grinding wheel 2. Of course in general it is also possible that the grinding arm according to the invention is used in connection with a grinding worm.

While specific embodiments of the invention have been shown and described in detail to illustrate the inventive principles, it will be understood that the invention may be embodied otherwise without departing from such principles.

I claim:

1. A grinding arm for grinding of workpieces with an inner profile with a grinding wheel,
    wherein the grinding arm has a tube-shaped base body with a longitudinal axis and two axial end regions, the grinding wheel being supported at a first of the axial end regions and a first drive for the grinding wheel being arranged in a second of the axial end regions, wherein a transmission of rotation from the first drive to the grinding wheel takes place by way of a first transmission system,
    wherein the grinding wheel is arranged on a grinding spindle which is driven by the first transmission system and rotates around an axis of rotation,
    wherein the grinding spindle is supported in a carrier body which is arranged in the base body so as to be rotatable around an axis, which axis is perpendicular to the longitudinal axis as well as perpendicular to the axis of rotation, wherein the axis of rotation and the axis intersect.

2. The grinding arm according to claim 1, further comprising a second transmission system having a second drive, wherein the carrier body is rotatable in the base body via the second drive.

3. The grinding arm according to claim 2, wherein the second transmission system comprises a second belt, or a second chain which runs between the two axial end regions of the base body.

4. The grinding arm according to claim 3, wherein the second belt or the second chain is connected with the carrier body and can rotate the carrier body around the axis.

5. The grinding arm according to claim 4, wherein the bearing of the carrier body occurs by means of two roller bearings in one axial end region of the base body.

6. The grinding arm according to claim 1, wherein clamping means are arranged by which the carrier body can be clamped in the base body in a relative position.

7. The grinding arm according to claim 6, wherein the clamping means includes a hydraulically expandable mandrel.

8. The grinding arm according to claim 1, wherein the first transmission system comprises a first belt, or a first chain which runs between the two axial end regions of the base body.

9. The grinding arm according to claim 8, wherein the first belt or the first chain drives a first gear element, which is rotatably supported in one of the axial end regions of the base body, wherein the first gear element drives a second gear element, which is connected with the grinding spindle.

10. The grinding arm according to claim 9, wherein the second gear element is arranged on an intermediate shaft which drives the grinding spindle via a further pair of year elements.

11. The grinding arm according to claim 9, wherein the first gear element is a crown wheel, a bevel wheel or a friction wheel.

* * * * *